United States Patent
Mertens et al.

(10) Patent No.: US 7,375,050 B2
(45) Date of Patent: May 20, 2008

(54) SYNTHESIS AND USE OF ALUMINOPHOSPHATES AND SILICOALUMINOPHOSPHATES

(75) Inventors: Machteld M. Mertens, Boortmeerbeek (BE); Marcel J. G. Janssen, Kessel Lo (BE); Teng Xu, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 710 days.

(21) Appl. No.: 10/425,587

(22) Filed: Apr. 28, 2003

(65) Prior Publication Data

US 2004/0215044 A1    Oct. 28, 2004

(51) Int. Cl.
  *C01B 15/16*    (2006.01)
  *C01B 25/26*    (2006.01)
  *B01J 27/00*    (2006.01)
  *B01J 27/182*   (2006.01)
  *C07C 1/00*     (2006.01)

(52) U.S. Cl. .................. 502/214; 502/208; 423/305; 423/306; 423/DIG. 32; 585/639; 585/640

(58) Field of Classification Search ................ 423/305, 423/306, DIG. 30, DIG. 32; 502/208, 214; 585/639, 640
See application file for complete search history.

(56) References Cited

U.S. PATENT DOCUMENTS

| | | | |
|---|---|---|---|
| 3,030,181 A | 4/1962 | Milton | 23/113 |
| 4,440,871 A | 4/1984 | Lok et al. | 502/214 |
| 4,495,303 A | 1/1985 | Kuehl | 502/62 |
| 4,544,538 A | 10/1985 | Zones | 423/326 |
| 5,108,727 A * | 4/1992 | Davis | 423/305 |
| 5,124,136 A * | 6/1992 | Davis | 423/705 |
| 6,403,855 B1* | 6/2002 | Mertens | 585/640 |
| 6,514,899 B1 | 2/2003 | Mertens et al. | 502/214 |
| 6,620,983 B1 | 9/2003 | Cao et al. | 585/640 |
| 6,767,858 B1* | 7/2004 | Cao et al. | 502/214 |
| 2003/0105248 A1 | 6/2003 | Cao et al. | 526/72 |
| 2003/0129128 A1 | 7/2003 | Strohmaier et al. | 423/716 |
| 2003/0153799 A1* | 8/2003 | Mertens et al. | 585/639 |
| 2003/0232006 A1* | 12/2003 | Cao et al. | 423/705 |
| 2003/0232718 A1 | 12/2003 | Cao et al. | 502/214 |
| 2005/0249661 A1* | 11/2005 | Higuchi et al. | 423/700 |
| 2006/0016724 A1* | 1/2006 | Miller et al. | 208/24 |

FOREIGN PATENT DOCUMENTS

CN    110615    8/1995

(Continued)

OTHER PUBLICATIONS

U.S. Appl. No. 09/997,778, Mertens et al.

(Continued)

*Primary Examiner*—J. A. Lorengo
*Assistant Examiner*—Patricia L Hailey (57) ABSTRACT

Disclosed are methods and compositions of synthesis mixtures for the synthesis of aluminophosphates and silicoaluminophosphate molecular sieves, which enable the control and adjustment of the crystal particle size of aluminophosphates and silicoaluminophosphate molecular sieves. The synthesis mixture compositions used have two or more organic templates present at a molar ratio of total template to aluminum of $\leq 1.25$; such a synthesis mixture is susceptible to control of product particle size through variation in the amount of seeds used in the synthesis.

71 Claims, 1 Drawing Sheet

CRYSTAL SIZE VS SEEDING LEVEL

FOREIGN PATENT DOCUMENTS

| | | |
|---|---|---|
| EP | 91049 | 3/1983 |
| EP | 91048 | 10/1983 |
| EP | 143642 | 6/1985 |
| EP | 107370 | 3/1989 |
| EP | 0 541 915 | 5/1993 |
| GB | 868846 | 5/1961 |
| GB | 2061500 | 5/1981 |
| WO | WO 97/03020 | 1/1997 |
| WO | WO 00/06493 | 2/2000 |

OTHER PUBLICATIONS

U.S. Appl. No. 09/997,779, Mertens et al.

De Chen et al., Microporous and Mesoporous Materials, 29, 191-203 (1999).

He, Changquing et al., Journal of Molecular Catalysis (China), vol. 8, No. 3, 207-212, 1994.

He, Changquing et al., Chinese Journal of Catalysis, vol. 16, No. 1, 33-37, 1995.

He, Changquing et al., Journal of Fuel Chemistry and Technology, vol. 23, No. 3, 306-311, 1995.

Prakash, A.M. et al., J. Chem Soc. Faraday Trans., 90(15), 2291-2296, 1994.

M. Briend et al., J. Phys. Chem., 99, 8270-8276, 1995.

Concepcion, P. et al, "Preparation and Characterization of Mg-Containing AF1 and Chabazite-Type Materials," Zeolites, Elsevier Science Publishing, US, vol. 16, No. 1, 1996, pp. 56-64.

* cited by examiner

SYNTHESIS AND USE OF ALUMINOPHOSPHATES AND SILICOALUMINOPHOSPHATES

FIELD OF INVENTION

This invention relates to the synthesis of aluminophosphates and silicoaluminophosphate molecular sieves and to the use of these aluminophosphates and silicoaluminophosphate molecular sieve in catalytic processes. In particular the present invention relates to the synthesis of aluminophosphate and silicoaluminophosphate molecular sieves wherein specific amounts of templates are used in combination with seeding of the synthesis mixture.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydro-carbon feedstock. It has been known for some time that oxygenates, especially alcohols e.g. methanol, are convertible into light olefin(s). The preferred methanol conversion process is generally referred to as methanol-to-olefin(s) (MTO) process, where methanol is converted to primarily ethylene and propylene in the presence of a molecular sieve.

Some of the most useful molecular sieves for converting methanol to olefin(s) are the metalloaluminophosphates such as the silicoaluminophosphates (SAPO's). There are a wide variety of SAPO molecular sieves known in the art; of these the more important examples include SAPO-5, SAPO-11, SAPO-18, SAPO-34, SAPO-35, SAPO-41 and SAPO-56. For the MTO process SAPO molecular sieves having the CHA framework type (*Atlas of Zeolite Framework Types,* 2001, 5th Edition, p. 96) and especially SAPO-34 are particularly important catalysts. The CHA framework type has a double six-ring structure in an ABC stacking arrangement. The pore openings of the structure are defined by eight member rings that have a diameter of about 4.0 Å, and cylindrical cages within the structure of approximately 10×6.7 Å. Other SAPO molecular sieves of CHA framework type include SAPO-44, SAPO-47 and ZYT-6.

The synthesis of $AlPO_4$ and SAPO molecular sieves is a complicated process. There are a number of variables, which need to be controlled in order to optimise the synthesis in terms of the purity, yield, and quality of the SAPO molecular sieve produced.

It is known that silicoaluminophosphates of relatively small particle size are particularly effective in the MTO process. De Chen, et al., reported that SAPO-34 crystals of 0.4 to 0.5 µm gave the largest capacity of olefin formation (*Microporous and Mesoporous Materials,* 29, 191-203, 1999). In this work, the crystals were obtained from a single batch of crystals, which was fractionated to obtain the differently sized crystals evaluated.

In U.S. Pat. No. 4,440,871, the synthesis of SAPO materials of various framework types is described. The reference suggests that, whilst not essential, seeding of the reaction mixture with seed crystals of either the SAPO species to be produced or a topologically similar aluminophosphate or aluminosilicate composition, facilitates the crystallization procedure. In Examples 51 and 53, SAPO-31 is prepared from a mono-templated reaction mixture in which di-n-propylamine is used as template in combination with $AlPO_4$-31 seeds.

In WO 00/06493, colloidal crystalline molecular sieve seeds are used in the manufacture of phosphorus-containing molecular sieves. The use of these seeds produces phosphorus-containing molecular sieves of controlled final particle size of at most 0.75 µm and narrow particle size distribution. In the specific examples a dual template system of di-n-propylamine (DPA) and tetraethylammonium hydroxide (TEAOH) is used at a ratio of template to $Al_2O_3$ of 2.6:1, i.e., a molar template to aluminum ratio of 1.3:1.

In EP 0 541 915 A1, it was reported that metal aluminophosphate molecular sieves of reduced particle size may be manufactured by the use of high speed stirring of the reaction mixture when TEAOH is used as templating agent.

He, Changquing et al., also reported that the variation of the mole ratio of $TEAOH:NEt_3$ in a dual templated synthesis of SAPO-34 allowed control of crystal dimensions (*Journal of Molecular Catalysis (China),* 8:3, 207-212 (1994); *Chinese Journal of Catalysis (CUIHUA XUEBAO),* 16:1, 33-37 (1995); Chinese Patent Application No. 1106715A). He, Changquing et al., also reported that variation in the composition of template enabled adjustment of the acid center distribution of the synthesized SAPO-34 (*Journal of Fuel Chemistry and Technology,* 23:3, 306-311 (1995)).

We have now found new methods for the manufacture of crystalline aluminophosphate or silicoaluminophosphate molecular sieves that allow control of the crystal size of the molecular sieve. In addition, the molecular sieve crystals obtained by these methods possess excellent catalytic properties, especially when used in catalytic processes for the preparation of olefins from oxygenate feed-stocks. These new methods also allow preparation of silicoaluminophosphate molecular sieves of the CHA framework type with low acid site density.

SUMMARY OF THE INVENTION

In one embodiment, the invention provides a method for selecting the crystal size of crystalline molecular sieves through variation in the concentration of seeds used during their synthesis. The method comprises: (a) forming a synthesis mixture comprising a source of aluminum, a source of phosphorus, seeds, at least two organic templates $R^1$ and $R^2$, and optionally a source of silicon, wherein the molar ratio of organic template ($R^1+R^2$) to aluminum (Al) in the synthesis mixture is $\leq 1.25$, and the amount of seeds is selected to provide the required crystal size in the formed crystalline molecular sieve; (b) forming crystalline molecular sieve from the synthesis mixture; and (c) recovering the formed crystalline molecular sieve.

In another embodiment, the invention provides a synthesis mixture for the manufacture of an aluminophosphate or silicoaluminophosphate which is capable of providing crystals of differing crystal size and crystal size distribution through variation of seed concentration used in the synthesis mixture. The synthesis mixture comprises a source of aluminum, a source of phosphorus, seeds, at least two organic templates $R^1$ and $R^2$, and optionally a source of silicon, wherein the organic templates are present in a molar ratio of template ($R^1+R^2$) to aluminum (Al) of less than or equal to ($\leq$) 1.25.

In another embodiment, the invention provides for the use during the synthesis of aluminophosphate or silicoaluminophosphate molecular sieves of a template mixture comprising at least two organic templates $R^1$ and $R^2$ in a molar ratio of organic template ($R^1+R^2$) to aluminum (Al) in the synthesis mixture of $\leq 1.25$ in combination with variation of the amount of seeding to control the crystal size of a crystalline aluminophosphate or silicoaluminophosphate molecular sieve.

In another embodiment, the invention provides a crystalline aluminophosphate or silicoaluminophosphate molecular sieve prepared by any of the methods described herein.

In another embodiment, the invention provides a method of making olefin product, the method comprising providing a crystalline molecular sieve and contacting a feedstock comprising at least one oxygenate with the crystalline molecular sieve to form olefin product. The step of providing the crystalline molecular sieve comprises (a) forming a synthesis mixture comprising a source of aluminum, a source of phosphorus, at least two organic templates $R^1$ and $R^2$, optionally a source of silicon, and seeds, wherein the molar ratio of organic template ($R^1+R^2$) to aluminum (Al) in the synthesis mixture is $\leq 1.25$; and (b) forming the crystalline molecular sieve from the synthesis mixture.

DETAILED DESCRIPTION OF THE INVENTION

We have found that certain synthesis mixtures for the manufacture of silicoaluminophosphates or aluminophosphates are particularly susceptible to being used in combination with variation in seeding levels to control the crystal size and crystal size distribution of the final molecular sieve product. Also, we have found that the crystalline molecular sieves obtained from these synthesis mixtures possess excellent catalytic performance, in particular when used in processes for the manufacture of olefins from oxygenate feedstocks. The molecular sieves obtained by the method of the present invention have very high selectivity to lower olefins, in particular ethylene and propylene, and low selectivity to coke.

The molecular sieves of the present invention can be manufactured by utilizing a molecular sieve synthesis mixture comprising at least two organic templates ($R^1$ and $R^2$) at specified levels and preferably specified ratios to aluminum (Al). In particular, it has been found that synthesis mixtures having a ratio of organic templates ($R^1+R^2$) to aluminum (Al) of 1.25 or less are particularly suitable. This is in contrast to those synthesis mixtures that have only one organic template or higher molar ratios of template to aluminum, which produce molecular sieves with different crystal sizes and/or different crystal size distributions and/or lower selectivity to lower olefins.

It has been found that the inventive synthesis mixtures, in contrast to those with higher levels of templates, are susceptible to the use of seeds in the synthesis mixture to control the particle size and/or particle size distribution and/or catalytic properties of the molecular sieves prepared by the methods of the present invention.

Molecular Sieve Synthesis

Generally, aluminophosphate and silicoaluminophosphate molecular sieves are synthesized by the hydrothermal crystallization of one or more of a source of aluminum, a source of phosphorus, with a source of silicon for silicoaluminophosphate, and one or more organic templates.

Typically, a combination of sources of silicon, aluminum and phosphorus, optionally with one or more templating agents (also referred to herein as templates) and/or also optionally one or more metal containing compounds are placed in a sealed pressure vessel, optionally lined with an inert plastic such as polytetrafluoroethylene, and heated, under a crystallization pressure and temperature, until a crystalline material is formed, and then recovered by filtration, centrifugation and/or decanting.

In a typical synthesis of the molecular sieve, the phosphorus-, aluminum-, and optionally silicon-containing components are mixed, preferably while stirring and/or agitating and/or seeding with a crystalline material, optionally with an alkali metal, in a solvent such as water, and one or more templating agents, to form a synthesis mixture. This mixture or gel is then heated under crystallization conditions of pressure and temperature as described in U.S. Pat. No. 4,440,871.

As examples of structure types produced there may be mentioned more especially molecular sieves of the framework types CHA and LEV. The term "framework type" is used herein in the sense described in the "Atlas of Zeolite Framework Types", 5th Edition (2001).

In the process of the present invention, seeds are used in the synthesis mixture. The seeds may be any seeding material that is capable of seeding the growth of aluminophosphate or silicoaluminophosphate molecular sieves from a synthesis mixture. Such seeds may be obtained by the various methods described herein or those generally known in the art. It is preferred that the seeds are colloidal seeds as hereinafter defined.

Suitable seeds include, for example, crystals of structure type LEV, OFF, and CHA. Specific examples of seeds include Levyne, ZSM-45, Chabazite, Offretite and SAPO-34. Manufacture of OFF-structure type seed crystals, in particular colloidal Offretite seeds, may be carried out as described in WO 97/03020, while suitable procedures, including details of synthesis mixtures and hydrothermal treatment, for the manufacture of LEV- and CHA-structure type crystals are described in EP-A-91048, 91049, 107 370, 143 642 and U.S. Pat. No. 4,495,303 (for LEV) and GB-A-868 846 and 2 061 500 and U.S. Pat. Nos. 3,030,181 and 4,544,538 (for CHA). A colloidal suspension of LEV may be obtained by synthesizing a LEV structure type molecular sieve by hydrothermal treatment of an appropriate synthesis mixture, and separating the product from the synthesis mixture, washing the product, and recovering the resulting wash liquid. Examples of the LEV structure type include Levyne, NU-3, ZK-20, ZSM-45 and SAPO-35. Manufacture of CHA- and LEV-structure type seed crystals is also described in WO 00/06493. Preferred colloidal seeds are SAPO-34 seeds as manufactured according to U.S. patent application Ser. Nos. 09/997,778 and 09/997,779, both filed Nov. 29, 2001.

The seeds are generally present in the synthesis mixture in a concentration of up to 10000 ppm, advantageously at most 3000 ppm, more advantageously at most 1500 ppm, and preferably at most 1000 ppm, more preferably at most 500 ppm, and most preferably at most 350 ppm, based on the total weight of the synthesis mixture. A minimum seeding level is generally 1 ppb (0.001 ppm), advantageously at least 0.1 ppm, more advantageously at least 1 ppm, and preferably at least 10 ppm, based on the total weight of the synthesis mixture. Advantageous ranges of proportions are from 1 ppm to 2000 ppm, preferably 100 ppm to 1500 ppm, and most preferably 100 ppm to 250 ppm.

The colloidal seeds are advantageously incorporated in the synthesis mixture in the form of a suspension, advantageously in an aqueous medium, preferably water, or another liquid component of the synthesis mixture. In a less preferred embodiment they may be added in dry, but not calcined, form and in an even less preferred embodiment they may be calcined. It is believed that calcination significantly reduces the activity of small crystallites to act as seeds; similarly any other treatment that reduces the seeding activity of materials should be avoided. As used herein, the term "colloidal", when used of a suspension, refers to one containing discrete finely divided particles dispersed in a continuous liquid phase and preferably refers to a suspension that is stable, in the sense that no visible separation occurs or sediment forms, in a period sufficient for the use intended, advantageously for at least 10 hours, more advantageously at least 20 hours, preferably at least 100 hours, and more preferably at least 500 hours at ambient temperature (about 23° C.).

The maximum size of the particles for the suspension to remain stable (peptized) will depend to some extent on their shape, on the nature and pH of the continuous medium, as well as on the period during which the suspension must remain usable. In general, the maximum dimension will be 1000 nm, advantageously 500 nm, more advantageously 400 nm, preferably 300 nm, more preferably 200 nm, and most preferably 100 nm. The particles may be of spherical, columnar, rod, coffin, platelet, cube or needle shapes. Where particles are platelets or needles, the dimension referred to is their smallest dimension. The minimum dimension is such that the particles do not dissolve or re-dissolve in the medium, and for crystallinity they must contain at least a small plurality, advantageously at least two, preferably four, unit cells of the crystal.

The minimum particle size is in general 5 nm, advantageously 10 nm, and preferably 20 nm. Mean particle sizes are generally in the range 5 nm to 1000 nm, advantageously 10 nm to 300 nm, more advantageously 10 nm to 200 nm, and preferably 20 nm to 100 nm. Advantageously at least 50%, more advantageously at least 80%, and more preferably at least 95%, by number, of the particles are greater than the given minima, smaller than the given maxima, or within the given ranges of particle size. Measurements of particle size may be effected by electron microscopy, for example using a Philips SEM 515 unit. The smaller the particle size of the seeds, the lower the weight percentage that is effective. The crystals are advantageously stirred into the synthesis mixture for a time sufficient to provide a uniform dispersion, this time being dependent primarily on the viscosity of the synthesis mixture, and also on the scale and type of the equipment, but ranging generally from 30 seconds to 10 minutes.

Whilst the seed crystals are typically of the same molecular sieve to be synthesized, this is not essential. It is possible to use seed crystals of a structure type different from that of the desired molecular sieve. Such seeding may be regarded as "heterostructural", whereas seeding with seeds of the same structure type is termed "isostructural", whether or not the seeds are of the same composition (i.e., contain the same elements in the same proportions) as the crystalline molecular sieve to be produced.

Where the seeds are of a framework type different from those of the desired molecular sieve, advantageously the seeds and the desired molecular sieve are topologically similar. For example, they may be members of the ABC-6 group of materials, as described in "Topochemistry of Zeolites and Related Materials", J. V. Smith, Chem. Rev. 1988, 88, 149 at 167. The ABC-6 group includes, inter alia, the Offretite, Chabazite and Levyne structures.

Apart from the presence of the seeds and the composition of the template mixtures used in the process of the present invention, the synthesis mixtures may be those that are generally known in the art or as described in the literature as suitable for the production of the molecular sieves concerned. This is also the case for the conditions of treatment, except that the presence of the seeds or specific template composition may make possible the reduction of reaction times or may obviate stirring if that were otherwise necessary.

In general, the treatment of the synthesis mixture to yield the desired phosphorus-containing crystalline molecular sieve, usually termed hydrothermal treatment, though strictly that term should be used only for treatments in which there is vapor-phase water present, is advantageously carried out under autogenous pressure, for example in an autoclave, for example a stainless steel autoclave which may, if desired, be PTFE-lined. The treatment may, for example, be carried out at a temperature within the range of from 50° C., advantageously from 90° C., especially 120° C., to 250° C., depending on the molecular sieve being made. The treatment may, for example, be carried out for a period within the range of from 20 hours to 200 hours, preferably up to 100 hours, again depending on the molecular sieve being formed. The procedure may include an aging period, either at room temperature or, preferably, at a moderately elevated temperature, before the hydrothermal treatment at more elevated temperature. The latter may include a period of gradual or stepwise variation in temperature.

For certain applications, the treatment is carried out with stirring or with rotating the vessel about a horizontal axis (tumbling). For other applications, static hydrothermal treatment may be used. If desired, the synthesis mixture may be stirred or tumbled during an initial part of the heating stage, for example, from room temperature to an elevated, e.g., the final treatment, temperature, and be static for the remainder. Agitation generally produces a product with a smaller particle size and a narrower particle size distribution than static hydrothermal treatment. In the process of the present invention agitation is preferred.

The colloidal LEV seeds are especially suitable to provide crystalline molecular sieves of the CHA framework type. Examples of such CHA materials are SAPO-, AlPO-, MeAPO-, MeAPSO-, ElAPSO- and ElAPO-47 and especially the corresponding–34 materials. In these formulae, El represents magnesium, zinc, iron, cobalt, nickel, manganese, chromium or mixtures of any two or more such elements. CHA framework type seeds may also be used in synthesis of these materials. LEV, OFF and CHA framework type seeds may be used in the synthesis of SAPO-, AlPO-, MeAPO-, MeAPSO-, ElAPSO- and ElAPO-materials of the LEV framework type, e.g., the –35 materials. Where a material is referred to as, for example, a SAPO material, this terminology includes the possibility that additional elements may be present, either in the framework or otherwise, as in the case discussed below, of Ni-SAPO.

The process of the present invention is of particular benefit in the manufacture of silicoaluminophosphates of the framework type CHA and in particular SAPO-34.

The process of the present invention is capable of providing aluminophosphate and silicoaluminophosphate molecular sieves in which the average particle size is consistently 1 μm or less, preferably 0.75 μm or less and most preferably 0.5 μm or less. At the same time the crystalline material has a controllably narrow particle size distribution in which as much as 80% (by number) of the particles are within ±10% of the mean. The molecular sieve crystal sizes may be determined by various methods known in the art. Conveniently, particle size is determined from electron microscopy pictures from a collection of about 100 crystals.

The synthesis mixture for producing molecular sieves according to the present invention is preferably of a composition suitable for the manufacture of a silicoaluminophosphate of framework type CHA, especially SAPO-34. In this regard the synthesis mixture advantageously has a molar composition, apart from the optional seeds, within the following ranges:

| | |
|---|---|
| $P_2O_5:Al_2O_3$ | 0.9 to 1.2:1 |
| $SiO_2:Al_2O_3$ | 0.05 to 0.4:1 |
| $H_2O:Al_2O_3$ | 10 to 100:1 |

In addition, at least two organic templates are used in a specified amount as total template and preferably in specified proportions to each other and to other components of the synthesis mixture. Thus, in the present invention, two or more organic templates ($R^1$ and $R^2$) are used in a molar ratio of total template ($R^1+R^2$) to aluminum (Al) in the synthesis mixture of 1.25 or less. In a preferred embodiment, the molar ratio of total template ($R^1+R^2$) to aluminum is 1.1 or less, and more preferably 1.0 or less. In a separate preferred embodiment, the $SiO_2$ to $Al_2O_3$ molar ratio is 0.1:1 to 0.03:1.

Suitable templates for use in the process of the present invention for the manufacture of silicoaluminophosphates of CHA framework type may be selected from the group of tetraethylammonium compounds, such as tetraethyl ammonium hydroxide (TEAOH), tetraethyl ammonium phosphate, tetraethyl ammonium fluoride, tetraethyl ammonium bromide, tetraethyl ammonium chloride and tetra-ethyl ammonium acetate and also include DPA, isopropylamine, cyclohexylamine, methylbutylamine, morpholine, diethanolamine, trimethylethylenediamine and triethylamine or mixtures of two or more of these templates, in particular the mixture of TEAOH and DPA or TEAOH and morpholine, more preferably a mixture of TEAOH and morpholine.

Also suitable as templates are amines that would not normally be expected to produce SAPO molecular sieves of the CHA framework type. Such templates include templates comprising N,N-dimethylamino moieties. The most preferred templates of this type comprise N,N,-dimethylamino moieties having the general structure $(CH_3)_2N$—R, wherein R is a substituted or unsubstituted aliphatic or cycloaliphatic group. R may be a linear or branched alkyl group, or a linear or branched alcohol or a linear or branched amine-containing group. Preferably, R contains an alkyl group of from 1 to 12 carbon atoms, more preferably 1 to 10 carbon atoms, and most preferably 1 to 8 carbon atoms. Two or more of these amines maybe used as the templates of the present invention or one or more of these amines may be used in combination with one or more of the other template materials described in preceding paragraphs.

In an embodiment, the templates may be selected from one or more of the following N,N-dimethylamino compounds: N,N-dimethylethanolamine (DMEA), N,N-dimethylpropanolamine, N,N-dimethylbutanolamine, N,N-dimethylheptanolamine, N,N-dimethylhexanolamine, N,N-dimethylethylenediamine, N,N-dimethylpropylenediamine, N,N-dimethylbutylenediamine, N,N-dimethylheptylenediamine, N,N-dimethylhexylenediamine 1-dimethylamino-2-propanol, dimethylethylamine, dimethylpropylamine, dimethylheptylamine and dimethylhexylamine. More preferably, the template is selected from one or more of the following N,N-dimethylamino compounds: N,N-dimethylethanolamine, N,N-dimethylpropanolamine, and N,N-dimethylpropylenediamine. Most preferably, the template is N,N-dimethylethanolamine or N,N-dimethylpropylenediamine.

Advantageously, the molar ratio of $R^1$ to Al is at least 0.25, preferably at least 0.375, and most preferably at least 0.5, the molar ratio of $R^2$ to Al is at least 0.25, preferably at least 0.375, and most preferably at least 0.5, and the molar ratio of $R^1+R^2$ to Al is preferably at least 0.6, more preferably at least 0.75, even more preferably greater than 0.75, whilst the molar ratio of total organic template to aluminum in the synthesis mixture is maintained at 1.25 or less. In each instance, the balance of organic template to provide a total organic template of 1.25 or less, is either $R^2$ alone or in combination with one or more additional templates or $R^1$ alone or in combination with one or more additional templates. Preferably, the combined molar ratio of $R^1+R^2$ to aluminum (Al) in the synthesis mixture is within the range 0.5 to 1.25, more preferably within the range 0.6 to 1.1, more preferably within the range 0.7 to 1.0, and even more preferably within the range 0.75 to 1.0. In a preferred embodiment, $R^1$ is a tetraethylammonium compound, preferably TEAOH, and $R^2$ is morpholine or DPA.

The process of the present invention is particularly suitable for preparing silicoaluminophosphates of the desired particle size and particle size distribution but also silicoaluminophosphate molecular sieve materials of reduced acid density. By reduced acid density is meant silicoaluminophosphate materials having low silica content, i.e., 1 or less than 1 silicon atoms present per 12 T-atoms which constitute a CHA cage. It is preferred that the number of Si per cage is less than 1. In terms of Si/Al ratio, by low silica is meant that the Si/Al atomic ratio is less than 0.167.

In one preferred embodiment, when a templating agent is used in the synthesis of a molecular sieve, it is preferred that the templating agent is substantially, preferably completely, removed after crystallization by numerous well known techniques, for example, heat treatments such as calcination. Calcination involves contacting the molecular sieve containing the templating agent with a gas, preferably containing oxygen, at any desired concentration at an elevated temperature sufficient to either partially or completely decompose and oxidize the templating agent.

Method for Making Molecular Sieve Catalyst Compositions

The molecular sieves of the present invention may be combined with one or more formulating agents, to form a molecular sieve catalyst composition or a formulated molecular sieve catalyst composition. The formulating agents may be one or more materials selected from the group consisting of binding agents, matrix or filler materials, catalytically active materials and mixtures thereof. This formulated molecular sieve catalyst composition is formed into useful shape and sized particles by well-known techniques such as spray drying, pelletizing, extrusion, and the like. The methods and compositions for the manufacture of such catalysts and catalyst compositions are well known in the art.

Process for Using the Molecular Sieve Catalyst Compositions

The molecular sieve catalysts and compositions of the present invention are useful in a variety of processes including: cracking, hydrocracking, isomerization, polymerization, reforming, hydrogenation, dehydrogenation, dewaxing, hydrodewaxing, absorption, alkylation, transalkylation, dealkylation, hydrodecylization, disproportionation, oligomerization, dehydrocyclization and combinations thereof.

Particularly suitable processes include processes directed to the conversion of a feedstock comprising one or more oxygenates to one or more olefin(s) and a process directed to the conversion of ammonia and one or more oxygenates to alkyl amines and in particular methylamines. Particular oxygenates are one more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstocks include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. Particularly suitable feedstocks are methanol, ethanol, dimethyl ether, diethyl ether or a combination thereof, more preferably methanol and dimethyl ether, and most preferably methanol.

The most suitable process is generally referred to as gas-to-olefins (GTO) or alternatively, methanol-to-olefins (MTO). In a MTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s). Such processes and the conditions of operation are well known in the art.

The reaction processes can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in, for example, U.S. Pat. No. 4,076,796, U.S. Pat. No. 6,287,522 (dual riser), and *Fluidization Engineering*, D. Kunii and 0. Levenspiel, Robert E. Krieger Publishing Company, New York, N.Y. (1977).

The preferred reactor type are riser reactors generally described in *Riser Reactor, Fluidization and Fluid-Particle Systems*, pages 48 to 59, F. A. Zenz and D. F. Othmo, Reinhold Publishing Corporation, New York (1960), U.S. Pat. No. 6,166,282 (fast-fluidized bed reactor), and WO 01/85872 (multiple riser reactor).

In the preferred embodiment, a fluidized bed process or high velocity fluidized bed process includes a reactor system, a regeneration system and a recovery system.

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s). Preferably the liquid is water or methanol, and the gas is an inert gas such as nitrogen.

In an embodiment, the amount of fresh feedstock fed separately or jointly with a vapor feedstock, to a reactor system is in the range of from 0.1 weight percent (wt %) to about 85 wt %, preferably from about 1 wt % to about 75 wt %, more preferably from about 5 wt % to about 65 wt %, based on the total weight of the feedstock including any diluent contained therein. The liquid and vapor feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred; however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel. Typically, a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C. most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically, the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone.

The WHSV is maintained at a level sufficient to keep the catalyst composition in a fluidized state within a reactor.

Typically, the WHSV ranges from about 1 hr$^{-1}$ to about 5000 hr$^{-1}$, preferably from about 2 hr$^{-1}$ to about 3000 hr$^{-1}$, more preferably from about 5 hr$^{-1}$ to about 1500 hr$^{-1}$, and most preferably from about 10 hr$^{-1}$ to about 1000 hr$^{-1}$. In one preferred embodiment, the WHSV is greater than 20 hr$^{-1}$; preferably the WHSV for conversion of a feedstock containing methanol and dimethyl ether is in the range of from about 20 hr$^{-1}$ to about 300 hr$^{-1}$.

The superficial gas velocity (SGV) of the feedstock including diluent and reaction products within the reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/s), preferably greater than 0.5 m/s, more preferably greater than 1 m/s, even more preferably greater than 2 m/s, yet even more preferably greater than 3 m/s, and most preferably greater than 4 m/s.

In one preferred embodiment of the process for converting an oxygenate to olefin(s) using a silicoaluminophosphate molecular sieve catalyst composition, the process is operated at a WHSV of at least 20 hr$^{-1}$ and a Temperature Corrected Normalized Methane Selectivity (TCNMS) of less than 0.016, preferably less than or equal to 0.01. See, for example, U.S. Pat. No. 5,952,538.

In another embodiment of the process for converting an oxygenate such as methanol to one or more olefin(s) using a molecular sieve catalyst composition, the WHSV is from 0.01 hr$^{-1}$ to about 100 hr$^{-1}$, at a temperature of from about 350° C. to 550° C., and silica to $Me_2O_3$ (Me is a Group IIIA or VIII element from the Periodic Table of Elements) molar ratio of from 300 to 2500. See, for example, EP 0642485 B1.

Other processes for converting an oxygenate such as methanol to one or more olefin(s) using a molecular sieve catalyst composition are described in WO 01/23500 (propane reduction at an average catalyst feedstock exposure of at least 1.0).

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 wt % based on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration pressure is in the range of from about 15 psia (103 kPaa) to about 500 psia (3448 kPaa), preferably from about 20 psia (138 kPaa) to about 250 psia (1724 kpaa), more preferably from about 25 psia (172 kPaa) to about 150 psia (1034 kPaa), and most preferably from about 30 psia (207 kPaa) to about 60 psia (414 kpaa).

The preferred residence time of the molecular sieve catalyst composition in the regenerator is in the range of from about one minute to several hours, most preferably about one minute to 100 minutes, and the preferred volume of oxygen in the gas is in the range of from about 0.01 mole percent (mol %) to about 5 mol %, based on the total volume of the gas.

In one embodiment, regeneration promoters, typically metal-containing compounds such as platinum, palladium and the like, are added to the regenerator directly, or indirectly, for example with the coked catalyst composition. Also, in another embodiment, a fresh molecular sieve catalyst composition is added to the regenerator containing a regeneration medium of oxygen and water as described in U.S. Pat. No. 6,245,703.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The burning of coke is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated molecular sieve catalyst composition from the regeneration system and passing the regenerated molecular sieve catalyst composition through a catalyst cooler that forms a cooled regenerated molecular sieve catalyst composition. The catalyst cooler, in an embodiment, is a heat exchanger that is located either internal or external to the regeneration system.

In one embodiment, the cooler regenerated molecular sieve catalyst composition is returned to the regenerator in a continuous cycle. Alternatively (see WO 01/94282), a portion of the cooled regenerated molecular sieve catalyst composition is returned to the regenerator vessel in a continuous cycle, and another portion of the cooled molecular sieve regenerated molecular sieve catalyst composition is returned to the riser reactor(s), directly or indirectly, or a portion of the regenerated molecular sieve catalyst composition or cooled regenerated molecular sieve catalyst composition is contacted with by-products within the gaseous effluent (WO 00/49106). In another embodiment, a regenerated molecular sieve catalyst composition contacted with an alcohol, preferably ethanol, 1-propanol, 1-butanol or a mixture thereof, is introduced to the reactor system, as described in U.S. Pat. No. 6,441,262.

Other methods for operating a regeneration system are in disclosed U.S. Pat. No. 6,290,916 (controlling moisture).

The regenerated molecular sieve catalyst composition withdrawn from the regeneration system, preferably from the catalyst cooler, is combined with a fresh molecular sieve catalyst composition and/or recirculated molecular sieve catalyst composition and/or feedstock and/or fresh gas or liquids, and returned to the riser reactor(s). In another embodiment, the regenerated molecular sieve catalyst composition withdrawn from the regeneration system is returned to the riser reactor(s) directly, preferably after passing through a catalyst cooler. In one embodiment, a carrier, such as an inert gas, feedstock vapor, steam or the like, semicontinuously or continuously, facilitates the introduction of the regenerated molecular sieve catalyst composition to the reactor system, preferably to the one or more riser reactor(s).

By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidised Beds*, Grace, Avidan and Knowlton, eds. Blackie, 336-337 (1997).

Coke levels on the molecular sieve catalyst composition are measured by withdrawing from the conversion process the molecular sieve catalyst composition at a point in the process and determining its carbon content. Typical levels of coke on the molecular sieve catalyst composition after regeneration are in the range of from 0.01 wt % to about 15 wt %, preferably from about 0.1 wt % to about 10 wt %, more preferably from about 0.2 wt % to about 5 wt %, and most preferably from about 0.3 wt % to about 2 wt % based on the total weight of the molecular sieve and not the total weight of the molecular sieve catalyst composition.

In one preferred embodiment, the mixture of fresh molecular sieve catalyst composition and regenerated molecular sieve catalyst composition and/or cooled regenerated molecular sieve catalyst composition contains in the range of from about 1 to 50 wt %, preferably from about 2 to 30 wt %, more preferably from about 2 to about 20 wt %, and most preferably from about 2 to about 10 wt % coke or carbonaceous deposit based on the total weight of the mixture of molecular sieve catalyst compositions. See, for example, U.S. Pat. No. 6,023,005.

The gaseous effluent is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example, various condensers, heat exchangers, refrigeration systems or chill trains, compressors, knock-out drums or pots, pumps, and the like.

The metalloaluminophosphate molecular sieve materials and catalyst compositions of the present invention may be used in the manufacture of alkylamines, using ammonia. Examples of suitable processes are as described in EP 0 993 867 A1, and in U.S. Pat. No. 6,153,798.

EXAMPLES

In the following examples, X-ray Powder Diffractograms were recorded on a Scintag X1 diffractometer with voltage of 45 kV and current of 40 mA, using a Cu K alpha target. Elemental analysis of Al, Si, and P was performed using Inductively Coupled Plasma (ICP) spectroscopy. Crystal size determination was performed by measuring the size of a collection of about 100 crystals on scanning electronic microscopy pictures.

Example 1

Synthesis of Stage 1 LEV Seeds 15.95 parts of sodium aluminate (Dynamit Nobel, 53% $Al_2O_3$, 41% $Na_2O$, 6% $H_2O$), 19.95 parts of sodium hydroxide (Baker, 98.6%) and 5.58 parts of potassium hydroxide (Baker, 87.4%) were dissolved in 151.06 parts of water, and heated to boiling until a clear solution was obtained. After cooling to room temperature, water loss was compensated, to form Solution A.

270.60 parts of colloidal silica (Ludox HS40, 40% $SiO_2$) were mixed with 106.12 parts of choline chloride (hereinafter identified by R, Fluka) forming a viscous mass, and Solution A was added with stirring at increasing speed as the viscosity decreased, together with 190 parts of rinse water, mixing then continuing for a further 5 minutes. The molar composition was:

To 290 parts of this mixture, 0.49 parts of conventional dry powder LEV zeolite seeds were added and a sample transferred to an autoclave, where it was heated in a 120° C. oven for 144 hours. The product was washed, recovered by centrifuging and dried overnight at 120° C.

The product comprised spherical aggregates of from 2 to 2.5 µm as shown by SEM, made up of ~100 nm particles, with an X-ray diffraction pattern (XRD) of ZSM-45 (LEV framework type), as described in EP A 107 370.

Example 2

Preparation of Stage 2 LEV Seeds

The Stage 1 LEV seeds of Example 1 were used as seeds in the following synthesis. 8.38 parts of sodium aluminate, 10.53 parts of sodium hydroxide, 2.96 parts of potassium hydroxide, and 78.95 parts of water were treated as described in Example 1 to form a Solution B. Solution B was then added to a mixture of 142.42 parts of colloidal silica and 55.5 parts of choline chloride, together with 100.00 parts of rinse water and mixed as described in Example 1, but with the addition of 0.68 parts of the first stage LEV seeds. The reaction mixture was heated in an autoclave at 120° C. for 174 hours, the product recovered by washing, centrifuging and drying having an XRD similar to that of the product of Example 1.

The second supernatant of the washing procedure was not clear, and had a pH of 10.3. It was found to be a dispersion with a solids content of 2.3%. Analysis by scanning electron microscopy (SEM) and XRD showed ~100 nm non-aggregated crystals with ZSM-45 structure, LEV framework type. These are referred to as the Stage 2 LEV seeds.

Example 3

Preparation of Chabazite Seeds

This example illustrates the manufacture of a chabazite dispersion suitable for use in seeding SAPO-34 manufacture. The seeds were prepared as follows. A synthesis mixture was prepared as described in Example 1, except that the Stage 2 LEV seeds of Example 2 were used, at a seeding level of 0.15% by weight of solids. The seeded synthesis mixture was heated in a stainless steel autoclave for 96 hours at 120° C., with a heat-up time of 3 hours. The product, recovered by centrifuging and drying, had an XRD pattern corresponding to ZSM-45. The first supernatant was not clear and yielded, after centrifuging at 11000 rpm and further washing, a dispersion with solids content 4.6%, of crystals of size about 100 nm, XRD showing the product to be ZSM-45, a LEV structure-type zeolite. This is the LEV slurry used in the following part.

A solution C was prepared as described for Solution A in Example 1 using the following components, in the proportions shown:

| | |
|---|---|
| NaOH | 61.66 |
| KOH | 28.73 |
| Al(OH)$_3$ (Alcoa, 99.3%) | 15.73 |
| H$_2$O | 190.30 |

300.23 parts of colloidal silica and 168.89 parts of water were poured into a mixer, and Solution C added together with 12.65 parts of rinse water. After mixing for 5 minutes, 16 parts of the 4.6% solids LEV slurry were added. The molar composition of the synthesis mixture was:

3.8 Na$_2$O:1.12 K$_2$O:0.5 Al$_2$O$_3$:10 SiO$_2$:161H$_2$O, with 927 wt ppm seeds.

The synthesis mixture was heated in an autoclave to 100° C. over 2 hours, and maintained at that temperature for 96 hours. After cooling, the content of the autoclave, a milky suspension, was washed five times with demineralized water and centrifuged at 9000 rpm.

After taking a sample for XRD and SEM, the remainder was redispersed to form a colloidal solution, stable over several days, with a solids content of 6.4%. The XRD of the product shows it to be chabazite, with a uniform particle size of 100×400 nm.

Comparative Example 1

Preparation of SAPO-34 Using Chabazite Seeds with Dual Template at Template (R$^1$+R$^2$) Molar Ratio to Aluminum in the Synthesis Mixture of >1.25

This example illustrates the manufacture of SAPO-34 using two organic templates at a template molar ratio to aluminum in the synthesis mixture of >1.25 and with two levels of seeding with chabazite seeds. A synthesis mixture was prepared from the following components in the proportions shown in Table 1.

TABLE 1

| Composition | Component | CEX 1a (g) | CEX 1b (g) |
|---|---|---|---|
| A | Al$_2$O$_3$ (Pural SB Condea 75%) | 68.11 | 68.04 |
|   | H$_2$O | 100.31 | 100.02 |
| B | H$_3$PO$_4$ (Acros, 85%) | 115.72 | 115.78 |
|   | H$_2$O | 80.01 | 80.08 |
|   | H$_2$O, rinse | 26.75 | 22.37 |
| C | Colloidal Silica (Ludox AS40) | 22.56 | 22.14 |
|   | H$_2$O, rinse | 11.80 | — |
| D | TEAOH (Eastern Chemical, 40%) | 183.27 | 182.34 |
| E | DPA (Fluka) | 80.88 | 81.71 |
|   | H$_2$O, rinse | 69.24 | 81.15 |
| F | Seeds, 4.6 wt. % from Example 3 | 22.5 | 1.922 |

Composition A was prepared in a mixer, and Composition B added, when a viscous solution resulted. Then rinse water B was added. After mixing the paste for 6 minutes, C was added, and mixed for 2 minutes before adding Composition D. Upon adding E with the rinse water two phases were formed. After a further 3 minutes mixing a visually homogeneous solution resulted and after a further 10 minutes mixing, the seeds F were added. The molar compositions were:

CEX 1a:
Al$_2$O$_3$:P$_2$O$_5$:0.3 SiO$_2$:TEAOH:1.6 DPA:55H$_2$O+1851 wt ppm CHA seeds.

CEX 1b:
Al$_2$O$_3$:P$_2$O$_5$:0.3 SiO$_2$:TEAOH:1.6 DPA:52H$_2$O+163 wt ppm CHA seeds.

The seeded gels were heated for 60 hours at 175° C. in a stainless steel autoclave. The solid product was recovered by centrifugation, washed several times with ~700 mL of water to a conductivity of <30 μS/cm, and dried at 120° C. XRD and SEM showed a pure SAPO-34 product with crystals between 0.2 and 1.3 μm in both cases.

This comparative example illustrates that when a template to aluminum molar ratio of greater than 1.25 is used in the synthesis mixture the crystal size of the resultant SAPO-34 is not affected by the amount of seeds used in the synthesis mixture.

Comparative Example 2

Preparation of SAPO-34 Using Morpholine as Template 80.1 g of alumina (Pural SB Condea 75%) was mixed with 422.3 g of deionized water to form a slurry. To this slurry was added 135.61 g of phosphoric acid (85%) with stirring to form a homogeneous mixture. To this homogeneous mixture was added 53.1 g of colloidal silica (Ludox AS40), followed by the addition of 157.4 g of morpholine (98%) with mixing to form a homogeneous mixture. To this homogenized mixture was added 2.0 g of CHA seeds prepared according to Example 3. This resulted in an overall seed concentration in the mixture of 206 wt ppm. The molar composition of the mixture was:

Al$_2$O$_3$:P$_2$O$_5$:0.6 SiO$_2$:3 Morpholine:50H$_2$O+206 wt ppm CHA seeds.

The mixture was placed in a 1 liter stainless steel autoclave, heated up to 175° C. in 8 hours in static mode and kept at that temperature for 48 hours. The resultant slurry of crystalline material was washed and dried overnight at 120° C. The yield of dried material, expressed as a wt % of the total initial synthesis slurry, was 16.5%. SEM pictures indicated that the crystals had cubic morphology and a size between 0.4 μm and 7.7 μm. This material shall be referred to as CEX 2.

Example 4

Preparation of SAPO-34 seeds

Colloidal silica (Ludox AS 40, 27.9 parts by weight) was added to a TEAOH solution (522.0 parts by weight of a 35% solution in water). The resulting mixture was heated at 100° C. for 12 hours, forming Component A. Alumina (Al$_2$O$_3$, Condea Pural SB, 82.0 parts by weight) was placed in the bowl of a Kenwood mixer, and water (144.5 parts) was added with stirring to form a slurry of Component B. Phosphoric acid (H$_3$PO$_4$, 85% in water, Acros, 139.1 parts by weight) was added to Component B, followed by Component A. The molar composition of the mixture was:

Al$_2$O$_3$:P$_2$O$_5$:0.3 SiO$_2$:2.00 TEAOH:52H$_2$O.

This synthesis mixture was heated in a stainless steel autoclave over 2 hours to 175° C., and maintained at that temperature for 96 hours without stirring. The crystalline solid product was recovered by centrifugation, washed four times to a conductivity of about 32 μS/cm and dried overnight at 120° C. The crystals were pure SAPO-34; 50% of the crystals by number were smaller than 50 nm, 10% were larger than 100 nm.

Example 5

SAPO-34 synthesis using TEAOH and DPA 163.9 g of alumina (Pural SB Condea 75%) was mixed with 547.7 g of deionized water to form a slurry. To this slurry was added 278.3 g of phosphoric acid with stirring to form a homogeneous mixture. To this homogeneous mixture was added 54.2 g of colloidal silica (Ludox AS40), followed by the addition of 507.2 g of tetraethyl ammonium hydroxide (R$^1$) with mixing to form a homogeneous mixture. To this homogeneous mixture was added 121.9 g of diisopropyl amine (R$^2$). To this homogeneous mixture was added varying amounts of seeds prepared according to Example 4. The molar composition of the mixture without seeds was:

Al$_2$O$_3$:P$_2$O$_5$:0.3 SiO$_2$:TEAOH:DPA:50 H$_2$O

This gave a total template (R$^1$+R$^2$) to aluminum (Al) molar ratio of 1:1. The homogeneous and seeded mixture was placed in a stirred 2 liter stainless steel autoclave and crystallized at 175° C. for between 48 and 54 hours. The resultant slurry of crystalline material was washed and dried overnight at 120° C. The yield of dried material is expressed as a wt % of the total initial synthesis slurry. The average crystal size (μm) was measured from SEM pictures using a minimum 100 crystals. The results are provided in Table 2 and plotted in FIG. 1.

TABLE 2

Figure 1:
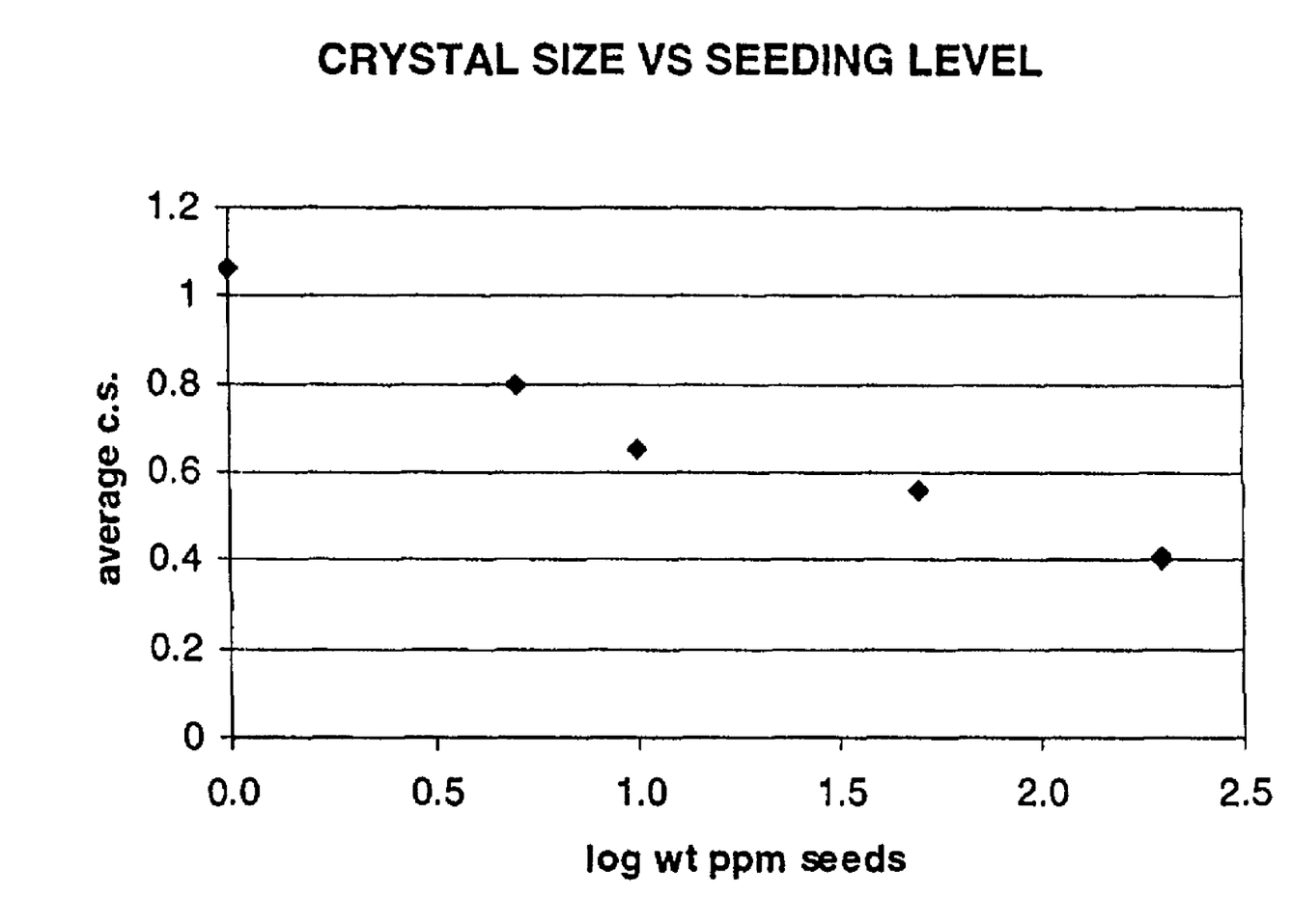
FIG. 1 is a plot of crystal size versus log wt ppm SAPO seeds used for the synthesis of SAPO-34 using a combination of TEAOH and DPA as organic template during synthesis.

| Sample | Seeds (log wt ppm) | Rpm | Temp (° C.) | Time (hr) | Yield (wt %) | Average Crystal Size by SEM (μm) |
|---|---|---|---|---|---|---|
| 1 | — | 60 | 175 | 48 | 18.4 | 1.06 |
| 2 | 0.7 | | 175 | 48 | 17.1 | 0.80 |
| 3 | 1 | 60 | 175 | 48 | 17.5 | 0.65 |
| 4 | 1.7 | 60 | 175 | 48 | 17.3 | 0.56 |
| 5 | 2.3 | 60 | 175 | 48 | 16.6 | 0.40 |
| 6 | 2.3 | 60 | 175 | 54 | 17.0 | 0.41 |

These results illustrate that in a dual template synthesis for SAPO-34, when the molar ratio of total template to aluminum is ≦1.25 the crystal size of the SAPO-34 product may be adjusted and controlled by variation of the amount of SAPO seeds used in the synthesis mixture. In addition, although low levels of silica are used in the synthesis, the yields of SAPO-34 product are very good.

Example 6

SAPO-34 Synthesis using TEAOH and Morpholine 167.0 g of alumina (Pural SB Condea 75%) was mixed with 600.6 g of deionized water to form a slurry. To this slurry was added 283.1 g of phosporic acid (85%) with stirring to form a homogeneous mixture. To this homogeneous mixture was added 18.4 g of colloidal silica (Ludox AS40), followed by the addition of 516.5 g of tetraethyl ammonium hydroxide (R$^1$, 35% aqueous solution, Sachem) with mixing to form a homogeneous mixture. To this homogeneous mixture was added 109.1 g of morpholine (R$^2$, 98%). To this homogeneous mixture was added 5.16 g of a slurry of seeds prepared according to Example 4 and containing 6.59 wt % of solids. This resulted in an overall seed concentration in the mixture of 200 wt ppm. The molar composition of the mixture was:

Al$_2$O$_3$:P$_2$O$_5$:0.1 SiO2:TEAOH: morpholine:50 H$_2$O+200 wt ppm SAPO-34 seeds This gave a total template (R$^1$+R$^2$) to aluminum molar ratio of 1:1. The mixture was placed in a 2 liter stainless steel autoclave stirred at 170 rpm, heated up to 175° C. in 8 hours and kept at that temperature for 48 hours. The resultant slurry of crystalline material was washed and dried overnight at 120° C. The yield of dried material, expressed as a wt % of the total initial synthesis slurry, was 6.0%. SEM pictures indicated that the crystals had cubic morphology. The crystals are fairly uniform in size. The average crystal size is about 0.5 μm. This material will be hereinafter referred to as Sample 7.

Example 7

Catalytic Performance

The materials were tested in a microflow reactor to evaluate their catalytic performance in the conversion of methanol to olefins. 38 mg of molecular sieve were mixed with 1 g of 100-μm silicon carbide. The mixture was loaded into a reactor made of ¼ inch (6.35 mm) silicon steel tubing. The reactor temperature was increased to 475° C. while the catalyst was under a flow of Helium (46 mL/min). After the reactor had reached the temperature of 475° C., it was kept at that temperature for about 30 to 40 minutes to ensure temperature stability. Methanol was flowed through the reactor at about 80 μL/min at 475° C., 25 psig (170 kPa) and 100 hr$^{-1}$ WLSV. The reactor effluent was sampled in a 15-loop sampling valve to obtain the gas phase selectivity data. The collected effluent samples were analyzed by on-line gas chromatography (Hewlett-Packard 6890) with a flame ionization detector. The column used was a Q-column.

The end-of-run coke (EOR) was measured by flowing a mixture of 10 mL/min of O$_2$ and 10 mL/min of He through the reactor while the reactor temperature was increased from 475° C. to 550° C. A portion of the gas stream that exited the reactor was sent into a nickel-containing methanator, which converted CO and CO$_2$ into methane in the presence of excess amount of H$_2$. The concentration of methane was then quantified by a FID detector. The amount of coke on the sieve was then quantified by comparing the integrated peak area from the FID detector with that of a calibration standard.

Coke selectivity was calculated based on the measurement of the end-of-ran coke (EOR) and the catalyst lifetime, i.e., coke selectivity (wt %)=EOR coke (g coke/g sieve)/{lifetime (g methanol/g sieve)*14/32 (g CH$_2$/g methanol)}*100.

The performance data obtained for Sample 7 and CEX 2 are given in Table 3, in which selectivities for methane (C$_1$), ethylene (C$_2^-$), ethane (C$_2$°), propylene (C$_3^=$), propane (C$_3$°), hydrocarbons having 4 carbon atoms (C$_4$), hydrocarbons having 5 or more carbon atoms (C$_5$+) and combined ethylene and propylene (C$_{2+3}^=$) are reported in weight percent, and lifetime is reported in grams of methanol converted per gram of catalyst used. These results show that Sample 7 has higher selectivities for ethylene and propylene, as well as longer catalyst lifetime than CEX 2.

TABLE 3

| Sample | $C_1$ | $C_2^-$ | $C_2^o$ | $C_3^-$ | $C_3^o$ | $C_4$ | $C_5^+$ | Coke | $C_{2+3}^-$ | lifetime |
|---|---|---|---|---|---|---|---|---|---|---|
| 7 | 1.54 | 37.18 | 0.42 | 39.17 | 0.88 | 13.11 | 4.66 | 3.05 | 76.35 | 18.12 |
| CEX 2 | 2.38 | 20.73 | 4.35 | 25.37 | 10.93 | 8.66 | 2.36 | 25.21 | 46.10 | 1.68 |

While the present invention has been described and illustrated by reference to particular embodiments, those of ordinary skill in the art will appreciate that the invention lends itself to variations not necessarily illustrated herein. For example, it is also contemplated the molecular sieves described herein are useful as absorbents, adsorbents, gas separators, detergents, water purifiers, and in other various uses in various areas such as agriculture and horticulture.

All patents, test procedures, and other documents cited herein, including priority documents, are fully incorporated herein by reference to the extent such disclosure is not inconsistent with this invention and for all jurisdictions in which such incorporation is permitted.

The invention claimed is:

1. A method for preparing silicoaluminophosphate molecular sieves of CHA framework type, the method comprising:
   (a) forming a synthesis mixture comprising a source of aluminum, a source of phosphorus, at least two organic templates $R^1$ and $R^2$, a source of silicon, and colloidal seeds in an amount selected to form crystalline molecular sieves having a desired crystal size, wherein $R^1$ comprises tetraethyl ammonium compounds, $R^2$ is a compound selected from the group consisting of dipropylamine, isopropylamine, cyclohexylamine, methylbutylamine, morpholine, diethanolamine, trimethylethylenediamine, triethylamine, and compounds containing N, N-dimethylamino moieties, and the molar ratio of organic template ($R^1+R^2$) to aluminum (Al) in the synthesis mixture is $\leq 1.1$; and
   (b) forming silicoaluminophosphate crystalline molecular sieves of CHA framework type and desired crystal size from the synthesis mixture.

2. The method of claim 1, wherein $R^1$ it is selected from the group consisting of tetraethyl ammonium hydroxide, tetraethyl ammonium phosphate, tetraethyl ammonium fluoride, tetraethyl ammonium bromide, tetraethyl ammonium chloride and tetraethyl ammonium acetate.

3. The method of claim 1, wherein $R^2$ is selected from the group consisting of dipropylamine, isopropylamine, cyclohexylamine, methylbutylamine, morpholine, diethanolamine, trimethylethylenediamine and triethylamine.

4. The method of claim 1, wherein $R^1$ is tetraethyl ammonium hydroxide and $R^2$ is dipropylamine.

5. The method of claim 1, wherein $R^1$ is tetraethyl ammonium hydroxide and $R^2$ is morpholine.

6. The method of claim 1, wherein the molecular sieve is of the SAPO-34 type.

7. The method of claim 1, wherein the molar ratio of organic template ($R^1+R^2$) to aluminum in the synthesis mixture is $\leq 1.0$.

8. The method of claim 1, wherein the molar ratio of organic template ($R^1+R^2$) to aluminum in the synthesis mixture is within the range 0.5 to 1.1.

9. The method of claim 1, wherein the molar ratio of organic template ($R^1+R^2$) to aluminum in the synthesis mixture is within the range 0.6 to 1.0.

10. The method of claim 1, wherein the molar ratio of organic template ($R^1+R^2$) to aluminum in the synthesis mixture is within the range 0.7 to 1.0.

11. The method of claim 1, wherein the molar ratio of organic template ($R^1+R^2$) to aluminum in the synthesis mixture is $\leq 0.75$.

12. The method of claim 1, wherein the molar ratio of $R^1$ to aluminum in the synthesis mixture is $\leq 0.25$.

13. The method of claim 1, wherein the molar ratio of $R^2$ to aluminum in the synthesis mixture is $\leq 0.25$.

14. The method of claim 1, wherein the seeds are silicoaluminophosphate molecular sieves.

15. The method of claim 1, wherein the seeds are crystalline molecular sieve of LEV, OFF or CHA framework type.

16. The method of claim 1, wherein the seeds have a mean particle size of from 5 to 1000 nm.

17. The method of claim 1, wherein the seeds have at least one dimension which is 400 nm or less.

18. The method of claim 1, wherein the seeds have at least one dimension which is 200 nm or less.

19. The method of claim 1, wherein the seeds have at least one dimension which is 100 nm or less.

20. The method of claim 1, wherein the synthesis mixture is stirred during step (b).

21. The method of claim 1, wherein the seeds are used at a level of up to 10000 ppm.

22. The method of claim 1, wherein the $SiO_2:Al_2O_3$ is within the range of from 0.05:1 to 0.4:1.

23. The method of claim 1, wherein the $SiO_2:Al_2O_3$ ratio is within the range of from 0.1:1 to 0.3:1.

24. The method of claim 1, wherein the crystalline silicoaluminophosphate molecular sieve exhibits a coke selectivity less than a crystalline silicoaluminophosphate molecular sieve made using only one organic template, a catalyst lifetime greater than a crystalline silicoaluminophosphate molecular sieve made using only one organic template, or both.

25. A synthesis mixture for the manufacture of a silicoaluminophosphate molecular sieve of CHA framework type which is capable of providing crystals of differing crystal size and crystal size distribution through variation of seed concentration in the synthesis mixture, the synthesis mixture comprising a source of aluminum, a source of phosphorus, colloidal seeds in an amount selected to form crystalline molecular sieves having a desired crystal size, at least two organic templates $R^1$ and $R^2$, and a source of silicon, $R^1$ comprising tetraethyl ammonium compounds, $R^2$ being a compound selected from the group consisting of dipropylamine, isopropylamine, cyclohexylamine, methylbutylamine, morpholine, diethanolamine, trimethylethylenediamine, triethylamine, and compounds containing N, N-dimethylamino moieties, and the organic templates being present in a molar ratio of template ($R^1 + R^2$) to aluminum (Al) of $\leq 1.1$.

26. The synthesis mixture of claim 25, wherein $R^1$ is selected from the group consisting of tetraethyl ammonium hydroxide, tetraethyl ammonium phosphate, tetraethyl ammonium fluoride, tetraethyl ammonium bromide, tetraethyl ammonium chloride and tetraethyl ammonium acetate.

27. The synthesis mixture of claim 25, wherein $R^2$ is selected from the group consisting of dipropylamine, isopropylamine, cyclohexylamine, methylbutylamine, morpholine, diethanolamine, trimethylethylenediamine and triethylamine.

28. The synthesis mixture of claim 25, wherein $R^1$ is tetraethyl ammonium hydroxide and $R^2$ is dipropylamine.

29. The synthesis mixture of claim 25, wherein $R^1$ is tetraethyl ammonium hydroxide and $R^2$ is morpholine.

30. The synthesis mixture of claim 25, wherein the molecular sieve is of the SAPO-34 type.

31. The synthesis mixture of claim 25, wherein the molar ratio of organic template ($R^1 + R^2$) to aluminum in the synthesis mixture is $\leq 1.0$.

32. The synthesis mixture of claim 25, wherein the molar ratio of organic template ($R^1 + R^2$) to aluminum in the synthesis mixture is within the range 0.5 to 1.1.

33. The synthesis mixture of claim 25, wherein the molar ratio of organic template ($R^1 + R^2$) to aluminum in the synthesis mixture is within the range 0.6 to 1.0.

34. The synthesis mixture of claim 25, wherein the molar ratio of organic template ($R^1 + R^2$) to aluminum in the synthesis mixture is within the range 0.70 to 1.0.

35. The synthesis mixture of claim 25, wherein the molar ratio of organic template ($R^1 + R^2$) to aluminum in the synthesis mixture is $\leq 0.75$.

36. The synthesis mixture of claim 25, wherein the molar ratio of $R^1$ to aluminum in the synthesis mixture is $\leq 0.25$.

37. The synthesis mixture of claim 25, wherein the molar ratio of $R^2$ to aluminum in the synthesis mixture is $\leq 0.25$.

38. The synthesis mixture of claim 25, wherein the seeds are silicoaluminophosphate molecular sieves.

39. The synthesis mixture of claim 25, wherein the seeds are crystalline molecular sieve of LEV or CHA framework type.

40. The synthesis mixture of claim 25, wherein the seeds have a mean particle size of from 5 to 1000 nm.

41. The synthesis mixture of claim 25, wherein the seeds have at least one dimension which is 400 nm or less.

42. The synthesis mixture of claim 25, wherein the seeds have at least one dimension which is 200 nm or less.

43. The synthesis mixture of claim 25, wherein the seeds have at least one dimension which is 100 nm or less.

44. The synthesis mixture of claim 25, wherein the seeds are present at a level of up to 10000 ppm.

45. The synthesis mixture of claim 25, wherein the $SiO_2:Al_2O_3$ is within the range of from 0.05:1 to 0.4:1.

46. The synthesis mixture of claim 25, wherein the $SiO_2:Al_2O_3$ is within the range of from 0.1:1 to 0.3:1.

47. The synthesis mixture of claim 25, wherein the crystalline silicoaluminophosphate molecular sieve exhibits a coke selectivity less than a crystalline silicoaluminophosphate molecular sieve made using only one organic template, a catalyst lifetime greater than a crystalline silicoaluminophosphate molecular sieve made using only one organic template, or both.

48. A method of making olefin product, the method comprising providing a crystalline silicoaluminophosphate molecular sieve of CHA framework type and desired crystal size and contacting a feedstock comprising at least one oxygenate with the crystalline molecular sieve to form olefin product, wherein the step of providing the crystalline molecular sieve comprises:
(a) forming a synthesis mixture comprising a source of aluminum, a source of phosphorus, at least two organic templates $R^1$ and $R^2$, a source of silicon, and colloidal seeds in an amount selected to form crystalline molecular sieves having a desired crystal size, wherein $R^1$ comprises tetraethyl ammonium compounds, $R^2$ is a compound selected from the group consisting of dipropylamine, isopropylamine, cyclohexylamine, methylbutylamine, morpholine, diethanolamine, trimethylethylenediamine, triethylamine, and compounds containing N, N-dimethylamino moieties, and the molar ratio of organic template ($R^1 + R^2$) to aluminum (Al) in the synthesis mixture is $\leq 1.1$; and
(b) forming the crystalline silicoaluminophosphate molecular sieve of CHA framework type and desired crystal size from the synthesis mixture.

49. The method of claim 48, wherein $R^1$ is selected from the group consisting of tetraethyl ammonium hydroxide, tetraethyl ammonium phosphate, tetraethyl ammonium fluoride, tetraethyl ammonium bromide, tetraethyl ammonium chloride and tetraethyl ammonium acetate.

50. The method of claim 48, wherein $R^2$ is selected from the group consisting of dipropylamine, isopropylamine, cyclohexylamine, methylbutylamine, morpholine, diethanolamine, trimethylethylenediamine and triethylamine.

51. The method of claim 48, wherein $R^1$ is tetraethyl ammonium hydroxide and $R^2$ is dipropylamine.

52. The method of claim 48, wherein $R^1$ is tetraethyl ammonium hydroxide and $R^2$ is morpholine.

53. The method of claim 48, wherein the molecular sieve is of the SAPO-34 type.

54. The method of claim 48, wherein the molar ratio of organic template ($R^1 + R^2$) to aluminum in the synthesis mixture is $\leq 1.0$.

55. The method of claim 48, wherein the molar ratio of organic template ($R^1 + R^2$) to aluminum in the synthesis mixture is within the range 0.5 to 1.1.

56. The method of claim 48, wherein the molar ratio of organic template ($R^1 + R^2$) to aluminum in the synthesis mixture is within the range 0.6 to 1.0.

57. The method of claim 48, wherein the molar ratio of organic template ($R^1 + R^2$) to aluminum in the synthesis mixture is within the range 0.70 to 1.0.

58. The method of claim 48, wherein the molar ratio of organic template ($R^1 + R^2$) to aluminum in the synthesis mixture is $\leq 0.75$.

59. The method of claim 48, wherein the molar ratio of $R^1$ to aluminum in the synthesis mixture is $\leq 0.25$.

60. The method of claim 48, wherein the molar ratio of $R^2$ to aluminum in the synthesis mixture is $\leq 0.25$.

61. The method of claim 48, wherein the seeds are silicoaluminophosphate molecular sieves.

62. The method of claim 48, wherein the seeds are crystalline molecular sieve of LEV or CHA framework type.

63. The method of claim 48, wherein the seeds have a mean particle size of from 5 to 1000 nm.

64. The method of claim 48, wherein the seeds have at least one dimension which is 400 nm or less.

65. The method of claim 48, wherein the seeds have at least one dimension which is 200 nm or less.

66. The method of claim 48, wherein the seeds have at least one dimension which is 100 nm or less.

67. The method of claim 48, wherein the synthesis mixture is stirred during step (b).

68. The method of claim 48, wherein the seeds are used at a level of up to 10000 ppm.

69. The method of claim 48, wherein the $SiO_2:Al_2O_3$ ratio is within the range of from 0.05:1 to 0.4:1.

70. The method of claim 69, wherein the $SiO_2:Al_2O_3$ ratio is within the range of from 0.1:1 to 0.3 :1.

71. The method of claim 48, wherein the crystalline silicoaluminophosphate molecular sieve exhibits a coke selectivity less than a crystalline silicoaluminophosphate molecular sieve made using only one organic template, a catalyst lifetime greater than a crystalline silicoaluminophosphate molecular sieve made using only one organic template, or both.

* * * * *